July 31, 1951 W. H. PETHICK 2,562,817
IMPLEMENT HITCH
Filed Dec. 19, 1947 2 Sheets-Sheet 1
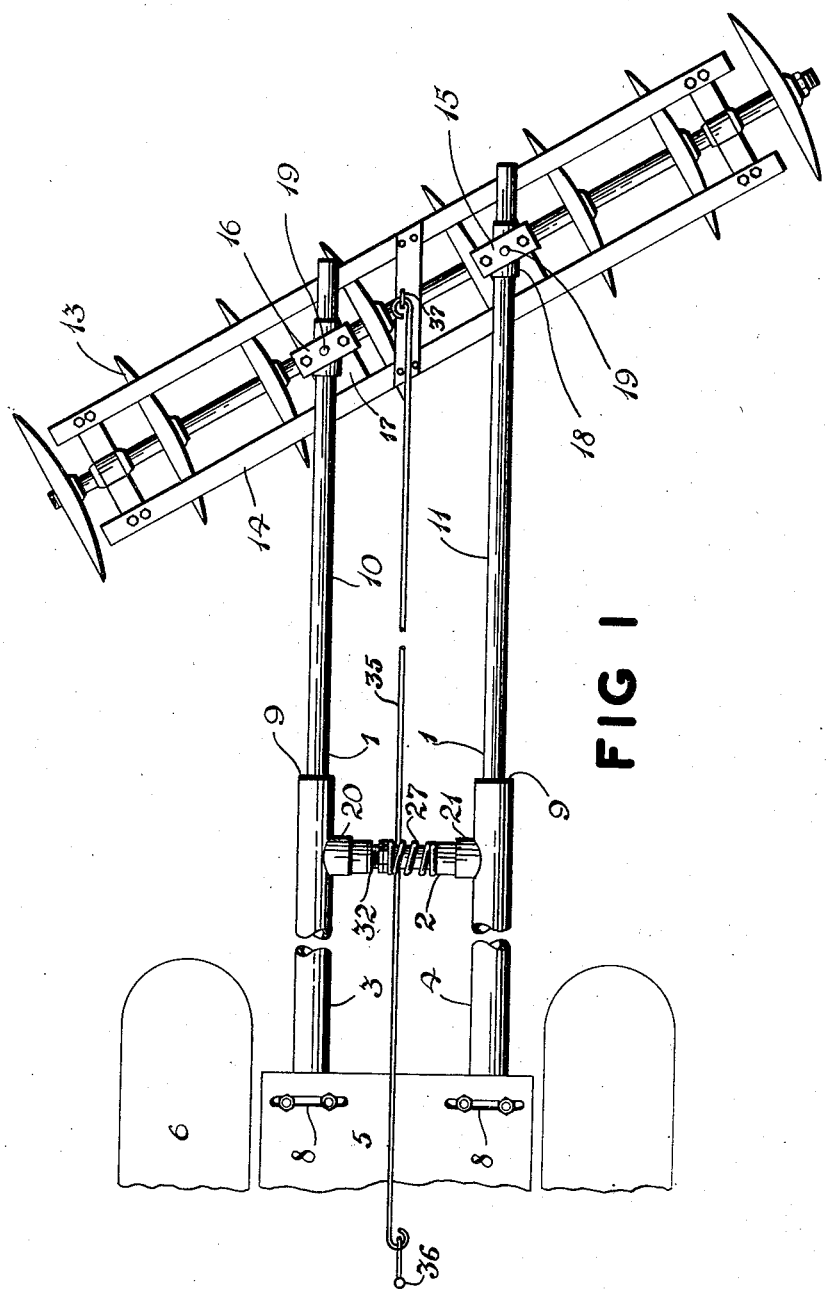
INVENTOR
WILLIAM HENRY PETHICK, DECEASED
HANNAH JOSEPHINE PETHICK, EXECUTRIX
By:
his Atty's.

July 31, 1951
W. H. PETHICK
2,562,817
IMPLEMENT HITCH
Filed Dec. 19, 1947
2 Sheets-Sheet 2
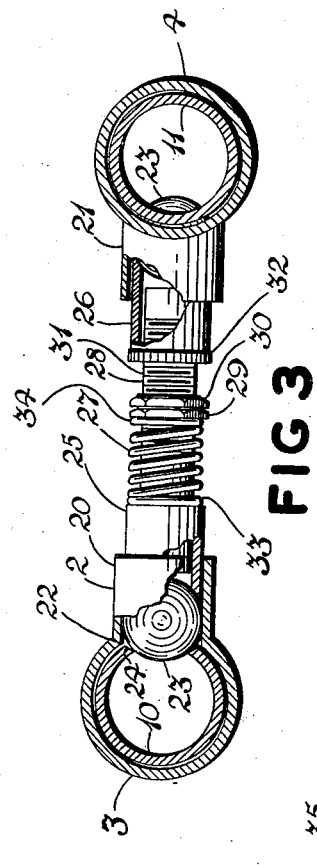
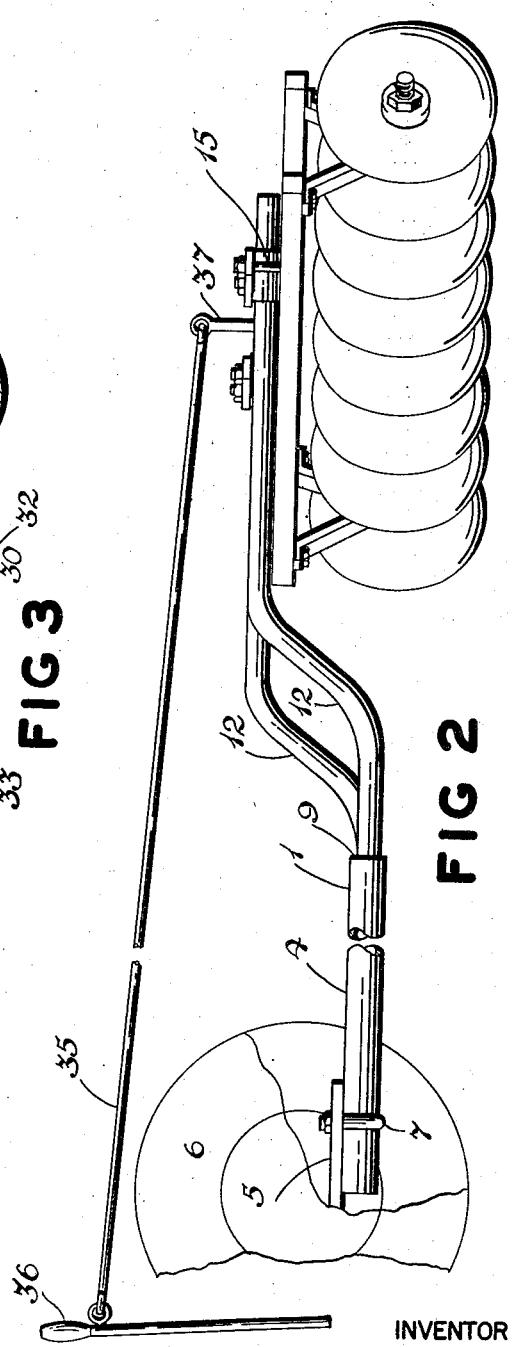
INVENTOR
WILLIAM HENRY PETHICK, DECEASED,
HANNAH JOSEPHINE PETHICK, EXECUTRIX
By: Fetherstonhaugh & Co
his Atty's.

Patented July 31, 1951

2,562,817

UNITED STATES PATENT OFFICE 2,562,817

IMPLEMENT HITCH

William Henry Pethick, deceased, late of Regina, Saskatchewan, Canada, by Hannah Josephine Pethick, executrix, Regina, Saskatchewan, Canada Application December 19, 1947, Serial No. 792,653

2 Claims. (Cl. 280—33.16)

The invention relates to implement hitches primarily for use with tractor drawn or tractor pushed agricultural implements and particularly that class known as disc-harrows or one-ways, an object of the invention being to provide a hitch of the character herewithin described by means of which the implement will be held rigidly against skewing, side-sway or vertical undulatory movement, otherwise "bucking" or any combination of these.

A further object of the invention is to provide means whereby, in the event of an obstruction in the path of the implement increasing the draft limits beyond those predetermined, so that the load limit on said tractor is exceeded, yieldable detaining means serving normally to maintain the telescopic assembly of the hitch in fixed relationship as to the component parts thereof will permit movement of the part or parts of the above said telescopic assembly which are attached to the tractor endwise relative to the part or parts attached to the implement, so that the tractor will continue to move forward while the implement remains stationary, such relative movement initiating the declutching of the tractor through the intermediacy of a drag-link extending between the tractor clutch lever and the implement or the part of the hitch which is rigidly secured thereto.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawings, in which:

Figure 1 is a plan view of the implement hitch shown connected to a tractor and disc-harrow.

Figure 2 is a side elevation of the mechanism recited with reference to Figure 1.

Figure 3 is a sectional representation of the yieldable detaining means.

In the drawings like characters of reference indicate corresponding parts in the different figures.

It is well recognised that the general pitching and tossing, slewing and general "bucketing" of comparatively light weight agricultural implements when processing the land is undesirable from the point of view of uniformity, of the striation or other process they are intended to be performing. By use of the hitch as described herein, independent movement of an implement either drawn or pushed by a tractor, relative to that tractor, has been eliminated. The only non-linear activity of the implement will therefore be that which is shared by the tractor and which will therefore be very much reduced quantitatively due to the unit-integration between tractor and implement which the hitch accomplishes.

Proceeding therefore to describe the hitch in relation to the associated tractor and implement illustrated, it will be observed that the essential components comprise a telescopic assembly collectively designated 1 and yieldable detaining means in the form of a spring loaded latch assembly collectively designated 2 extending transversely between a pair of parallel, horizontally disposed, and spaced sleeve members 3 and 4 forming part of the aforesaid telescopic assembly. The sleeves 3 and 4 are rigidly secured to any convenient part of the framework 5 of a tractor 6 by means of the U-bolts 7 which are welded to the sleeve members and extend through a pair of transverse slots 8 formed in the tractor framework 9. The slots 8 should be of sufficient length to permit of relative attachment of the sleeve members 3 and 4.

Engageable telescopically via the open ends 9 of the sleeve members 3 and 4, and forming part of the aforesaid telescopic assembly 1 are reaches 10 and 11 which may be straight for their entire length, or horizontally or vertically curved as at 12 according to the relative height at which it is desirable to attach the telescopic assembly to tractor and implement frameworks. In the case of the disc-harrow 13 depicted the desirable locus of attachment lies in a plane above that of the tractor hitch, and it will be seen that the method of attachment of the reaches 10 and 11 to the framework 14 of implement 13 consists of the clamping assemblies 15 formed of upper and lower plates 16 and 17 the latter of which are secured to framework 14. The aforesaid clamping assemblies engage collars 18 rigidly secured to reaches 10 and 11, stubs 19 extending upwardly through apertures in plates 16 and being secured to the aforesaid collars. Such arrangements are however purely arbitrary and may be considerably modified within the scope of the invention.

The latch assembly 2 best depicted in Figure 3 comprises a pair of open-ended sockets 20 and 21 secured to the sleeve members 3 and 4 respectively in axially right-angular relationship thereto. The aforesaid sockets are integral with the aforesaid sleeve members being secured thereto as by welding or the like around the edges of apertures 22 formed in the sleeve members.

Within the sockets 20 and 21 ball latching elements 23 are positioned which, as clearly illustrated, project into the interior of sleeve members 3 and 4, and through apertures 24 formed in the reaches 10 and 11 when the apertures 22 and 24 are in registration.

Pressure is applied to the balls 23 and against the perimeter of apertures 24 by means of the open-ended ferrules 25 and 26 under the influence of the spring 27 which surrounds a shaft 28 the ends whereof extend into the ferrules 25 and 26.

The degree of compression of spring 27 may be adjusted by a pair of lock nuts 29 and 30 rotatable upon the screw-threaded portion 31 of shaft 28. Adjacent to the aforesaid locknuts and also adjustable upon the screw-threaded portion 31 is an internally-screw-threaded spacer ring 32, and by rotation of this ring (which permanently bears against the adjacent perimeter of ferrule 26) the space between sleeve members 3 and 4 may be adjusted. In this context it is to be understood that the ends of shaft 28 move freely within the ferrules 25 and 26, and likewise ferrules 25 and 26 may move freely within sockets 20 and 21.

Accordingly, it will be recognised that under compression spring 27 bears via the end 33 thereof against the perimeter of ferrule 25, and via the end 34, against locknut 29 from whence pressure is exerted against ring 32 which in turn bears outwardly against the perimeter of ferrule 26 as aforesaid. Hence the balls 23 are maintained in latching engagement with the reaches 10 and 11 until a predetermined draft limit is exceeded when they are forced upwardly by the continued forward movement of the tractor and sleeve members 3 and 4 against the resistance of the reaches 10 and 11 under the influence of the obstructed implement.

When the conditions described in the last preceding paragraph supervene the drag-link 35 which is attached at one end to the conventional tractor clutch lever 36 and at the other end to an eye-bolt 37 secured to an implement framework 14, necessarily pulls the lever 37 clockwise with respect to the accompanying Figure 2 whereby the tractor engine is declutched from the transmission and hence the tractor is immediately halted in its tracks.

It will clearly be recognised in conclusion that the arrangements which have been described may all, with equal facility be secured to the front end of the tractor alternatively or additionally, and in this case it will be recognised that when the implement is obstructed and the tractor continues to move forwardly, the sleeve members will advance on the reaches towards the implement which will have exactly the same effect of pulling out the clutch via link 35 except that link 35 will be in compression instead of in tension.

Since various modifications can be made in the invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What is claimed as the invention is:

1. An agricultural implement comprising in combination a telescopic assembly embodying at least one pair of spaced, parallel and rigid sleeve members secured to an associated tractor, said members being open at least at one and the corresponding ends thereof each to receive telescopically therewithin a rigid reach connected to an associated implement, yieldable detaining means coacting between said sleeve members and said reaches for maintaining said reaches in fixed relationship within said sleeve members within predetermined draft limits but releasing said reaches when the load limit on said tractor is exceeded whereby said sleeve members may move endwise relative to said reaches, said yieldable detaining means consisting of a spring loaded latch assembly extending transversely between said sleeve members, said assembly including latches extending through said sleeve members and into apertures formed in said reaches.

2. An agricultural implement comprising in combination a telescopic assembly embodying at least one pair of spaced, parallel and rigid sleeve members secured to an associated tractor, said members being open at least at one and the corresponding ends thereof each to receive telescopically therewithin a rigid reach connected to an associated implement, yieldable detaining means coacting between said sleeve members and said reaches for maintaining said reaches in fixed relationship within said sleeve members within predetermined draft limits but releasing said reaches when the load limit on said tractor is exceeded whereby said sleeve members may move endwise relative to said reaches, said reaches being rigidly secured to the associated implement framework against horizontal rotation, said sleeve members being rigidly secured to said tractor against vertical or horizontal rotation, said yieldable detaining means consisting of a spring loaded latch assembly extending transversely between said sleeve members, said assembly including latching elements extending through said sleeve members and into apertures formed in said reaches.

HANNAH JOSEPHINE PETHICK,
Executrix of the Estate of William Henry Pethick, Deceased.

REFERENCES CITED

The following references are of record in the file of this patent:

UNITED STATES PATENTS

| Number | Name | Date |
|---|---|---|
| 1,323,634 | Kagay | Dec. 2, 1919 |
| 1,612,578 | Haugk | Dec. 28, 1926 |
| 2,102,722 | Kortering | Dec. 21, 1937 |
| 2,138,841 | Den Besten | Dec. 6, 1938 |
| 2,284,145 | Hansmann | May 26, 1942 |
| 2,311,826 | Grasswick | Feb. 23, 1943 |